United States Patent
Kollerud et al.

(10) Patent No.: US 12,413,218 B2
(45) Date of Patent: Sep. 9, 2025

(54) OFFSET DETECTION (71) Applicant: Nordic Semiconductor ASA, Trondheim (NO)

(72) Inventors: Martin Kollerud, Trondheim (NO); Kyrre Gonsholt, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 90 days.

(21) Appl. No.: 18/566,562

(22) PCT Filed: May 31, 2022

(86) PCT No.: PCT/EP2022/064754
§ 371 (c)(1),
(2) Date: Dec. 1, 2023

(87) PCT Pub. No.: WO2022/253834
PCT Pub. Date: Dec. 8, 2022

(65) Prior Publication Data
US 2024/0259005 A1   Aug. 1, 2024

(30) Foreign Application Priority Data
Jun. 3, 2021 (GB) ..................... 2107951

(51) Int. Cl.
*H03K 5/156* (2006.01)
*H03K 3/037* (2006.01)
*H03K 5/133* (2014.01)

(52) U.S. Cl.
CPC .......... *H03K 5/1565* (2013.01); *H03K 3/037* (2013.01); *H03K 5/133* (2013.01)

(58) Field of Classification Search
None
See application file for complete search history.

(56) References Cited

U.S. PATENT DOCUMENTS 5,781,588 A * 7/1998 Abe ............... H03G 3/3068
                                                   375/345
6,795,515 B1   9/2004 Riedle et al.
7,639,737 B2 * 12/2009 Palmer .............. H04L 7/041
                                                   375/232
(Continued)

OTHER PUBLICATIONS

International Search Report and Written Opinion for PCT/EP2022/064754, mailed Jul. 22, 2022, 13 pages.
(Continued)

*Primary Examiner* — Cassandra F Cox
(74) *Attorney, Agent, or Firm* — Klarquist Sparkman, LLP (57) ABSTRACT

A circuit portion comprises a signal generator, clocked by a clock signal, for generating an alternating logic signal comprising a repeated sequence of alternating logic transitions. A circuit sub-portion introduces a delay to the alternating logic signal. An edge-travel detector samples the delayed alternating logic signal and outputs an edge-travel signal representative of a timing of a logic transition in the alternating logic signal with respect to the clock signal. A mask block compares the edge-travel signal with a mask signal to determine whether the timing of the logic transition matches one or more candidate timings, and outputs a comparison signal in dependence on this determination.

16 Claims, 5 Drawing Sheets (56) References Cited

U.S. PATENT DOCUMENTS 8,432,754 B2 * 4/2013 Iwasaki ............... G11C 29/028
365/194
2007/0157057 A1 7/2007 Hess et al.
2020/0402929 A1 12/2020 Lentz et al.

OTHER PUBLICATIONS

IPO Combined Search and Examination Report under Sections 17 and 18(3) for Great Britain Application No. 2107951.2, dated Feb. 21, 2022, 8 pages.
Park et al., "A Fast, Accurate and Simple Critical Path Monitor for Improving Energy-Delay Product in DVS Systems," *IEEE/ACM International Symposium on Low Power Electronics and Design*, Aug. 2011, pp. 391-396.

* cited by examiner

FIG. 1

|  | Normal operation | | | | | | | |
|---|---|---|---|---|---|---|---|---|
| Positive Edge | | | | | | | | |
| Capture stage | 1 | 1 | 1 | 1 | 1 | 1 | 0 | 0 |
| Phase correction stage |  | 0 | 0 | 0 | 1 | 1 | 0 | 0 |
| Edge travel stage |  | 0 | 0 | 0 | 1 | 1 | 0 |  |
| Masking stage |  | 0 | 0 | 0 | 1 | 0 | 0 |  |
| Edge travel vs mask |  | 1 |  |  |  |  |  |  |
| Output (edge inside mask?) | 1 |  |  |  |  |  |  |  |
| Negative Edge | | | | | | | | |
| Capture stage | 1 | 0 | 0 | 0 | 1 | 1 | 0 | 0 |
| Phase correction stage |  | 1 | 1 | 1 | 1 | 0 | 0 | 0 |
| Edge travel stage |  | 0 | 0 | 0 | 1 | 1 | 0 |  |
| Masking stage |  | 0 | 0 | 0 | 1 | 0 | 0 |  |
| Edge travel vs mask |  | 1 |  |  |  |  |  |  |
| Output (edge inside mask?) | 1 |  |  |  |  |  |  |  |

FIG. 2

| | "Missing" | | | | | | | | |
|---|---|---|---|---|---|---|---|---|---|
| | | Positive Edge | | | | | | | |
| Capture stage | 1 | 1 | 1 | 0 | 0 | 0 | 0 | 1 | |
| Phase correction stage | | 1 | 1 | 0 | 0 | 0 | 0 | 1 | 0 |
| Edge travel stage | 0 | 0 | 0 | 1 | 0 | 0 | 0 | | |
| Masking stage | 0 | 0 | 0 | 0 | 1 | 1 | 0 | | |
| Edge travel vs mask | 0 | 0 | 0 | 0 | 0 | 1 | 0 | | |
| Output (edge inside mask?) | 0 | | | | | | | | |
| | | Negative Edge | | | | | | | |
| Capture stage | | 0 | 0 | 1 | 0 | 1 | 0 | 0 | |
| Phase correction stage | 1 | 1 | 1 | 0 | 1 | 1 | 0 | 0 | 0 |
| Edge travel stage | 0 | 0 | 0 | 1 | 0 | 0 | 0 | | |
| Masking stage | 0 | 0 | 0 | 0 | 1 | 1 | 0 | | |
| Edge travel vs mask | 0 | 0 | 0 | 0 | 0 | 0 | 0 | | |
| Output (edge inside mask?) | 0 | | | | | | | | |

| | Overshooting | Positive Edge | | | | | | | | |
|---|---|---|---|---|---|---|---|---|---|---|
| Capture stage | | | | | | | | | | |
| Phase correction stage | 1 | 1 | 1 | 1 | 1 | 1 | 1 | 1 | 1 | |
| Edge travel stage | | 0 | 0 | 0 | 0 | 0 | 0 | 0 | 1 | 0 |
| Masking stage | | 0 | 0 | 0 | 0 | 1 | 1 | 0 | 0 | |
| Edge travel vs mask | | 0 | 0 | 0 | 0 | 0 | 0 | 0 | 0 | |
| Output (edge inside mask) | 0 | | | | | | | | | |

| | | Negative Edge | | | | | | | | |
|---|---|---|---|---|---|---|---|---|---|---|
| Capture stage | | | | | | | | | | |
| Phase correction stage | 1 | 1 | 0 | 0 | 0 | 0 | 0 | 0 | 1 | 0 |
| Edge travel stage | | 0 | 0 | 0 | 0 | 0 | 1 | 0 | 1 | 0 |
| Masking stage | | 0 | 0 | 0 | 0 | 1 | 1 | 0 | 0 | |
| Edge travel vs mask | | 0 | 0 | 0 | 0 | 0 | 0 | 0 | 0 | |
| Output (edge inside mask?) | 0 | | | | | | | | | |

FIG. 5

OFFSET DETECTION

CROSS REFERENCE TO RELATED APPLICATIONS

This is the U.S. National Stage of International Application No. PCT/EP2022/064754, filed May 31, 2022, which was published in English under PCT Article 21(2), which in turn claims the benefit of Great Britain Application No. 2107951.2, filed Jun. 3, 2021.

BACKGROUND OF THE INVENTION

The present invention relates to integrated circuits (ICs) and more particularly to the provision of measures which may help protect against unauthorised access to certain parts of such devices.

Internal clocks are implemented in electronic devices to provide periodic timing signals to synchronise the processes performed by the device. A device may comprise various clock domains, each comprising circuitry configured to receive the same clock signal. Clock signals are typically designed to have a fixed or stable frequency so that the interchange of signals between components within a clock domain occurs in a predictable manner.

If an integrated circuit operates a different logic speed relative to its internal clock frequency, it is possible that logic signals will not reach an intended destination within the integrated circuit before a clock cycle is completed, thus allowing branches of code to be skipped—e.g. skipping part of an 'if' block to jump to an outcome.

This can result from a malfunction in the integrated circuit, but can also be exploited by hackers, who can implement a type of physical attack on integrated circuits known as a glitch attack. A glitch attack involves forcing an integrated circuit to operate at a different logic speed to its internal clock frequency, e.g. by applying a short duration pulse in order to rapidly drop supply voltage or by increasing the clock frequency. This may result in an increase or a decrease in logic speed relative to the internal clock frequency.

The Applicant has recognised that glitch attacks pose a security threat to integrated circuits, and thus it is desirable to detect anomalies in signal propagation in integrated circuits. Known defence designs utilise analogue devices to monitor the supply voltage directly in order to detect drops in supply voltage indicative of glitch attacks, or to monitor temperature in order to detect illegal temperature conditions indicative of glitch attacks.

However, such analogue defence designs can require a lot of power and can be expensive to produce. They must also be tailored specifically to the integrated circuits they are designed to monitor.

The present invention seeks at least partly to address the issues set out above.

SUMMARY OF THE INVENTION

From a first aspect the invention provides a circuit portion comprising:
a signal generator, clocked by a clock signal, for generating an alternating logic signal comprising a repeated sequence of alternating logic transitions;
a circuit sub-portion which introduces a delay to the alternating logic signal;
an edge-travel detector, configured to sample the delayed alternating logic signal and to output an edge-travel signal representative of a timing of a logic transition in the alternating logic signal with respect to the clock signal; and
a mask block, configured to:
 receive a mask signal representative of one or more candidate timings of the logic transition with respect to the clock signal, wherein the mask signal comprises a plurality of bit positions, each bit position corresponding to a portion of the period of the clock signal;
 compare the mask signal with the edge-travel signal to determine whether the timing of the logic transition matches the or one of the candidate timings; and
 output a comparison signal that is dependent on whether the timing of the logic transition matches the or one of the candidate timings.

Thus it will be seen by those skilled in the art the present invention provides the ability to compare the delay introduced by the circuit sub-portion with a candidate delay, represented by the mask signal. The mask signal can thus be set to represent an expected or allowable delay, and the actual delay introduced by the circuit sub-portion can be monitored to determine whether the actual delay deviates from the expected delay. If a deviation is detected, as a result of a change in value of the comparison signal, it can be possible to infer that the delay introduced by the sub-portion is abnormal. Such a deviation in the delay may be caused by a physical attack, such as a glitch attack, and appropriate action can be taken (e.g. by generating an alert or performing a circuit reset).

The circuit portion may be arranged on an integrated-circuit chip, such as a system-on-chip (SoC), e.g. a radio-on-a-chip.

The clock signal is preferably a periodic signal having a stable clock frequency. The clock signal may comprise a series of pulses occurring at the clock frequency. In some embodiments, the circuit portion comprises a clock configured to generate the clock signal.

Preferably the alternating logic signal transitions between two logic values (e.g. logic HIGH and logic LOW). In some embodiments, the alternating logic signal alternates (e.g. transitions between logic values) at the frequency of the clock signal. Preferably the alternating logic signal is a square wave.

It will be appreciated that, if the signal generator is clocked by a periodic signal having a stable clock frequency f, the alternating logic signal is essentially a periodic signal having a stable frequency $$\frac{f}{2}.$$

Thus, in some embodiments, the signal generator can be considered to be a clock configured to output the alternating logic signal.

The signal generator may comprise an oscillator. In some embodiments, the signal generator comprises a toggle flip-flop (TFF). The signal generator may comprise a generator flip-flop (e.g. comprising an input and an output), clocked by the clock signal, and an inverter. The output of the generator flip-flop may be connected to the input of the generator flip-flop via the inverter. It will be appreciated that the binary logic value stored by the generator flip-flop will thus alternate with each pulse of the clock signal, thereby providing the repeated sequence of alternating logic transitions. Those skilled in the art will appreciate that, although the use of flip-flops is primarily described in this application, such components may be implemented using latches as appropriate.

The circuit sub-portion may comprise any circuitry that introduces a delay to a received signal. The sub-portion may comprise any suitable component or module of an integrated-circuit chip. It will be appreciated that the present invention can be used to determine variations in the delay through any suitable or desired circuit sub-portion. The circuit sub-portion could therefore simply be another operational part of the circuit. However, in such embodiments, it may prove difficult to control the frequency at which the test is run, and to account for unpredictable variations in the delay caused by changes in operation of the circuitry. Therefore, in some embodiments, the circuit sub-portion is a dedicated delay portion. The circuit sub-portion may comprise a delay chain. The circuit sub-portion may comprise circuitry mimicking one or more critical paths in the circuit. In some embodiments, the circuit sub-portion comprises circuitry (e.g. a multiplexer) for adjusting the length of the delay. This may allow the circuit to be tuned with greater granularity.

The edge-travel signal may be a multi-bit signal, i.e. comprising a plurality of bit positions. Each bit position of the edge-travel signal may correspond to a portion of the period of the clock signal. The timing of the logic transition may be represented by the value of the edge-travel signal at each bit position. For example, a logic HIGH value (or a logic LOW value) at the least significant bit (LSB) position of the edge-travel signal may indicate that the logic transition occurred early in a clock period (e.g. at the start of the clock period). Conversely, a logic HIGH value (or a logic LOW value) at the most significant bit (MSB) position of the edge-travel signal may indicate that the logic transition occurred at a later point in the clock cycle (e.g. at the end).

In some embodiments, the edge-travel detector comprises a plurality of stages. The edge-travel detector may for example comprise one or more of a capture stage, a phase-correction stage, and an edge-travel stage. One or more of the stages of the edge-travel detector may be configured to generate a respective intermediate signal representative of the timing of the logic transition in the alternating logic signal with respect to the logic signal. The multiple stages may be used to generate the edge-travel signal in a format that is more appropriate for comparing with the mask signal.

The capture stage may be configured to sample the delayed alternating logic signal and to generate a first intermediate signal representative of the timing of the logic transition with respect to the logic signal. The capture stage may comprise a plurality of capture-stage flip-flops. Preferably the capture-stage flip-flops are clocked by a clock signal having the same frequency as the clock signal provided to the signal generator. The clock signal provided to the capture-stage flip-flops may be offset from the clock signal provided to the signal generator by a known phase offset. However, preferably the clock signals are in phase. More preferably, each of the capture-stage flip-flops is clocked by the same clock signal that is provided to the signal generator.

The capture-stage flip-flops are preferably configured to sample the delayed alternating logic signal upon receipt of each pulse of the clock signal (i.e. upon receipt of an active edge of the clock signal, which may be a rising edge or a falling edge). The capture-stage flip-flops may be configured to sample the delayed alternating logic signal such that the timing of the logic transition in the alternating logic signal, with respect to the clock signal, is indicated by digital values stored in the plurality of capture-stage flip-flops.

The capture stage may be configured to generate (upon receipt of each pulse of the clock signal) the first intermediate signal from the digital values stored in the plurality of capture-stage flip-flops. The first intermediate signal may be a multi-bit signal comprising a respective bit for each of the capture-stage flip-flops. Preferably the value of each respective bit corresponds to the digital value stored in the respective capture-stage flip-flop. For example, if the capture stage were to comprise five flip-flops, the first intermediate signal would be a five-bit binary signal, wherein each bit corresponds to the digital value stored in a respective flip-flop.

The capture stage may further comprise one or more delay elements, each configured to introduce a respective further delay to the delayed alternating logic signal. Each delay element may comprise a buffer. The delay elements may be configured to sub-divide the clock cycle evenly, e.g. such that each of the capture-stage flip-flops samples the alternating logic signal at a different (incremental) point in the clock cycle. For example, the further delay length may be equal to $$\frac{T}{n},$$

where T is the length of the clock cycle and n is the number of capture-stage flip-flops. Thus, the further delay length may be set in dependence on the clock frequency. In some embodiments, the circuit portion comprises circuitry for monitoring changes in the clock frequency. Unexpected changes in the clock frequency may be flagged as potential symptoms of an attack.

One or more of the capture-stage flip-flops may be arranged to sample the delayed alternating logic signal with no further delay having been applied by a delay element. One or more (e.g. all but one) of the capture-stage flip-flops may be arranged to sample the delayed alternating signal to which a respective further delay has been introduced by one or more of the delay elements.

The delay elements may provide different respective further delays. However, in some embodiments two or more of the delay elements are arranged in series such that a subsequent delay element receives the (delayed) output of a preceding delay element. Thus, the subsequent delay element may add to a cumulative further delay applied to the delayed alternating logic signal. More generally, each capture-stage flip-flop may sample the delayed alternating logic signal that is delayed by an amount that is longer, by a common further delay increment, than the respective amount by which the alternating logic signal is delayed at another of the capture-stage flip-flops.

The length of the further delay(s) may depend on the delay introduced by the circuit sub-portion. The further delay(s) may be set such that, during normal (e.g. expected or intended) operation of the circuit, the logic transition occurs approximately in the middle of the set of capture-stage flip-flops. This may allow both increases and decreases in the delay introduced by the circuit sub-portion to be distinguished.

The delay elements essentially allow each of the capture-stage flip-flops to sample the delayed alternating signal at a different point in the clock period. Depending on the length of the delay introduced by the circuit sub-portion, the logic transition will occur at a different point in the period of the clock signal. Thus, by effectively sampling the value of the alternating logic signal at different points in the clock period, the timing (with respect to the clock signal) at which the logic transition occurs can be determined. The longer the delay introduced by the circuit sub-portion, the later in the clock signal the logic transition will occur.

In some embodiments, the one or more delay elements may be arranged to delay respectively the clock signal provided to each capture-stage flip-flop, e.g. such that the clock signal provided to each capture-stage flip-flop is delayed by an incrementally increasing amount. It will be appreciated that this too may accomplish the effect of sampling the delayed alternating signal at different points in the clock period. In embodiments in which the capture-stage comprises one or more capture-stage latches, rather than flip-flops, the output of one capture-stage latch may be provided to the input of a subsequent latch, thereby introducing one or more further delays to provide a similar effect.

It will be appreciated that, by increasing the number of capture-stage flip-flops (e.g. and corresponding delay elements), the granularity of the determination of the logic transition timing can be improved, thereby facilitating more precise identification of the timing of the logic transition and, thus, the length of the delay. This means that smaller variations in the delay may be able to be detected, thereby helping to increase the sensitivity of the circuit portion of the present invention.

The edge-travel detector may be configured to output (upon receipt of each pulse of the clock signal) the first intermediate signal as the edge-travel signal. However, in some embodiments, the first intermediate signal is provided to a subsequent stage of the edge-travel detector for further processing.

In some embodiments, the edge-travel detector comprises a phase-correction stage configured to modify the first intermediate signal to generate a second intermediate signal, the value of which is independent on the direction of the logic transition, i.e. on whether the logic transition is from logic HIGH to logic LOW or vice versa. This may be beneficial in implementations where there is an imbalance between the rise and fall times of the clock cycle or alternating logic signal, as the direction of the logic transition can be taken into account in other parts of the circuit. However such a phase-correction stage is not essential and in other embodiments could be omitted.

The phase-correction stage may comprise a plurality of phase-correction XOR gates. Each phase-correction XOR gate may be arranged to receive the output of a respective capture-stage flip-flop. Each phase-correction XOR gate may be arranged to receive (e.g. additionally) the (e.g. non-delayed) alternating logic signal output by the signal generator. The second intermediate signal may be a multi-bit signal comprising a respective bit for each of the phase-correction XOR gates. Preferably the value of each respective bit in the second intermediate signal corresponds to the logic signal output by the respective phase-correction XOR gate. For example, if the phase correction stage were to comprise five phase-correction XOR gates, the second intermediate signal would be a five-bit binary signal, wherein each bit corresponds to the value output by a respective phase-correction XOR gate.

The edge-travel detector may be configured to output the second intermediate signal as the edge-travel signal. The edge-travel detector may be configured to output the second intermediate signal (or any other intermediate signal as appropriate) as a monitoring signal, e.g. for debugging purposes. In some embodiments, the second intermediate signal is provided to a subsequent stage of the edge-travel detector for further processing. If the phase-correction stage is omitted, the output of each capture-stage flip-flop may be provided (e.g. directly) to a subsequent stage of the edge-travel detector (e.g. to the edge-travel stage, which is described below).

In some embodiments the edge-travel detector further comprises an edge-travel stage configured to modify the first intermediate signal or the second intermediate signal to generate a third intermediate signal. The third intermediate signal may be a multi-bit signal comprising one unique bit and one or more opposite bits, the bit position of the unique bit being indicative of the timing of the logic transition with respect to the clock signal. For example, the third intermediate signal may comprise a single logic HIGH bit, the position of which is indicative of the timing of the logic transition with respect to the clock signal, and one or more logic LOW bits. Alternatively, the third binary signal may comprise a single logic LOW bit, the position of which is indicative of the timing of the logic transition with respect to the clock signal, and one or more logic HIGH bits.

By representing the logic transition as the bit position of a unique logic value (e.g. a logic HIGH) in the third intermediate signal, the format of the third intermediate signal may be more appropriate for comparing with the mask signal, as will be described below.

The edge-travel stage may comprise a plurality of edge-travel XOR gates. The edge-travel XOR gates may be arranged to receive the first intermediate signal or the second intermediate signal (e.g. the outputs of the capture-stage XOR gates or the outputs of the phase-correction XOR gates). One or more (e.g. all but two) of the edge-travel XOR gates may be arranged to receive logic values corresponding to a pair of neighbouring bits in the first intermediate signal or the second intermediate signal. One of the edge-travel XOR gates may be arranged to receive the LSB of the first intermediate signal or the LSB of the second intermediate signal and a (e.g. logic HIGH) signal provided by a voltage source. One of the edge-travel XOR gates may be arranged to receive the MSB of the first intermediate signal or the MSB of the second intermediate signal and a (e.g. logic LOW) signal provided by a ground connection.

The third intermediate signal may be a multi-bit signal comprising a respective bit for each of the edge-travel XOR gates. Preferably the value of each respective bit in the third intermediate signal corresponds to the logic signal output by the respective edge-travel XOR gate. For example, if the edge travel stage were to comprise six edge-travel XOR gates, the third intermediate signal would be a six-bit binary signal, wherein each bit corresponds to the value output by a respective edge-travel XOR gate.

In some embodiments, the edge-travel detector is configured to output the third intermediate signal as the edge-travel signal. However, the third intermediate signal may be provided to one or more subsequent stages of the edge-travel detector for further processing.

The mask block may comprise a mask input for receiving the mask signal. Preferably the format of the mask signal is the same as that of the edge-travel signal. This can help to improve the ease with which the signals are compared.

The one or more candidate timings may represent an allowable time period within which the logic transition is expected (or permitted) to occur. Thus, the candidate timings may indicate a normal operating condition for the circuit portion. By comparing the mask signal with the edge-travel signal, deviations from this normal operating condition, which may be representative of a circuit malfunction or a malicious attack, can be detected. The one or more candidate timings may be indicated depending on the value of the mask signal at each bit position. For example, a candidate timing may be indicated by a bit position in the mask signal having a logic HIGH value. The mask signal may have one or more bit positions corresponding to candidate timings.

The mask input may be arranged to receive the edge-travel signal. Thus, the circuit portion may be calibrated by generating an edge-travel signal and using said signal as an initial mask signal. The mask input may be arranged to receive an intermediate signal and to use said signal as an initial mask signal. The logic transition timing indicated by this initial signal can be used as a benchmark against which future variations in the delay can be measured. Such a calibration process may allow the circuit to be corrected for voltage or clock drift, circuit degradation or temperature change, the effects of which are typically more gradual than those of physical attacks. In some embodiments, multiple circuit portions in accordance with embodiments may be provided (e.g. on the same integrated circuit) so that changes in delay may continue to be monitored while a particular circuit portion is undergoing calibration, thereby helping to improve security.

The mask signal could be fixed, but in a set of embodiments it is configurable so that different candidate timings can be compared with the timing of a logic transition in the alternating logic signal. This can allow a user to provide and to adjust an allowed range of variability in the timing of the logic signal. For example, a wide range of candidate timings may be provided in situations in which the delay in the circuit sub-portion is permitted to vary considerably. However, when it is desired to detect variations in the delay with increased sensitivity, a mask signal indicating a smaller range of candidate timings may be provided. Thus, in contrast with the more inflexible conventional monitoring techniques discussed above, circuit portions in accordance with such embodiments of the present invention can be applied to a wide range of applications, owing to the configurability of the mask signal.

The mask signal may be configurable between a set of predetermined values. The mask signal may be set depending on the direction of the logic transition (e.g. adopting a first value when the logic transition is from logic HIGH to logic LOW and a second value when the logic transition is from logic LOW to logic HIGH). This may improve the versatility of the circuit portion in embodiments where there is an imbalance between the rise and fall times of the clock cycle or alternating logic signal, as this technique can allow a different allowable range of variability to be set depending on the direction of the logic transition. The mask signal may be set according to a current operating condition for the circuit, which may be determined using measurements from a temperature sensor or any other components suitable for monitoring the operation of the circuit.

The mask input may be arranged to receive the mask signal from an input peripheral, such as a network connection or a user-input device (e.g. a touchscreen or keyboard). This can allow the mask signal to be updated so that the timing of the logic transition indicated by the edge-travel signal can be compared with different candidate timings, as may be desired.

In some embodiments the mask block comprises a plurality of AND gates. Each AND gate may be arranged to receive a respective bit of the edge-travel signal. Each AND gate may be arranged to receive (e.g. additionally) a respective bit of the mask signal. Preferably, each AND gate is arranged to receive (and to compare) the same respective bit of the edge-travel signal and the mask signal, i.e. so that each AND gate compares the same bit position of the mask signal and the edge-travel signal. Thus, each AND gate may be associated with a respective bit position of the edge-travel signal and the mask signal. Each AND gate may be arranged to output a logic HIGH signal if a logic HIGH value is present at the same bit position in both the edge-travel signal and the mask signal.

The comparison signal may comprise a single bit (i.e. logic HIGH or logic LOW). Alternatively, the comparison signal may comprise a plurality of bit positions, e.g. each bit position of the comparison signal may correspond to the output of a respective one of the AND gates.

In preferred embodiments, the mask block comprises one or more OR gates arranged to compare the outputs of two or more of the AND gates and to generate the comparison signal in dependence on this comparison. One or more of the OR gates may be arranged to receive the respective outputs of a respective pair of AND gates which are associated with neighbouring bit positions of the edge-travel signal and the mask signal. One or more of the OR gates may be arranged in series, such that one or more of the OR gates is arranged to receive the output of a previous OR gate.

Preferably the OR gates are arranged such that, when a match is detected between the edge-travel signal and the mask signal at a common bit position, a logic HIGH value is propagated through the one or more OR gates and is output by the circuit portion as the comparison signal. The comparison signal could be a multi-bit signal but, in some embodiments, the comparison comprises a single bit, e.g. by using one or more OR gates to determine if any of the AND gates indicates a match.

It will be appreciated that embodiments of the present invention allow any variations in the delay that are greater than the allowed range of variability set by the mask signal to be detected, i.e. both speed up and speed down effects may be detected. The circuit may be configured to output one or more of the intermediate signals and/or the edge-travel signal for further processing, e.g. to determine if the logic transition has occurred earlier than expected or if it has occurred later than expected. In some embodiments, it may be possible to diagnose the manner in which an attack has been carried out from the determined change in delay.

The intermediate signal and/or the edge travel signal may be used in a calibration process to set a (e.g. initial) value of the mask signal. The circuit may comprise a microcontroller unit (MCU), a tester interface or dedicated on-chip circuitry for performing said further processing. Using a multi-bit signal (e.g. an intermediate signal or the edge travel signal) rather than a single-bit signal (e.g. the comparison signal) may help to decrease the time taken for reliable calibration of the mask signal.

The comparison signal may be processed further in any suitable or desired way. In some embodiments an alert is generated when the value of the comparison signal indicates that the timing of the logic transition is not the same as one of the candidate timings.

When viewed from a further aspect, the invention provides a circuit portion comprising:
  a signal generator, clocked by a clock signal, for generating an alternating logic signal comprising a repeated sequence of alternating logic transitions;
  a circuit sub-portion which introduces a delay to the alternating logic signal;
  an edge-travel detector, configured to sample the delayed alternating logic signal and to output an edge-travel signal representative of a timing of a logic transition in the alternating logic signal with respect to the clock signal; and a mask block, configured to:
receive a mask signal representative of one or more candidate timings of the logic transition with respect to the clock signal;
compare the mask signal with the edge-travel signal to determine whether the timing of the logic transition matches the or one of the candidate timings; and
output a comparison signal that is dependent on whether the timing of the logic transition matches the or one of the candidate timings.

BRIEF DESCRIPTION OF THE DRAWINGS

An embodiment of the invention will now be described, by way of example only with reference to the accompanying drawings in which.

DETAILED DESCRIPTION OF THE DRAWINGS

Figure 1:
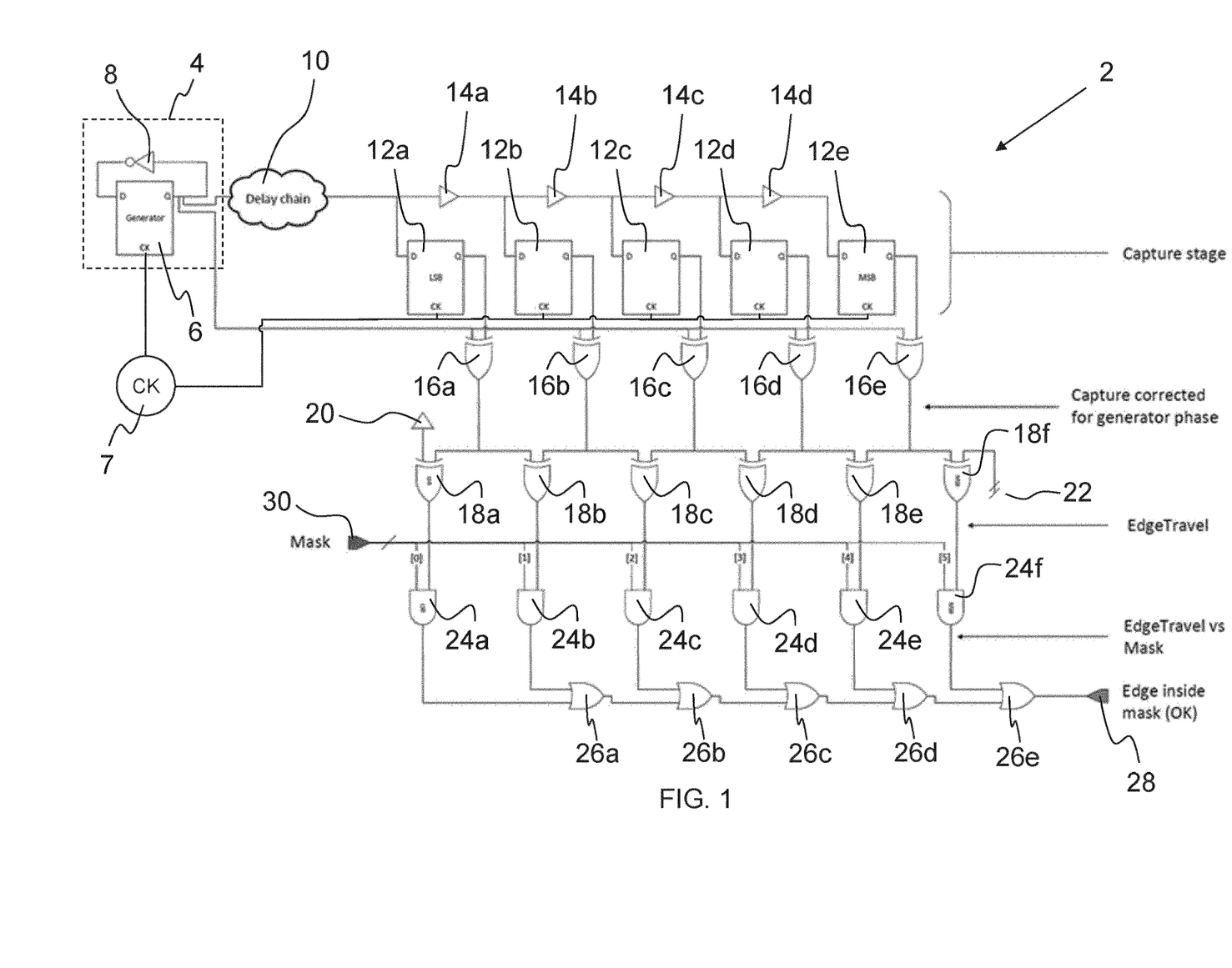
FIG. 1 shows a schematic diagram of an offset detection circuit in accordance with an embodiment of the present invention.

FIG. 1 shows a schematic diagram of an offset detection circuit 2 in accordance with an embodiment of the present invention.

The circuit 2 comprises a toggle flip-flop (TFF) 4 comprising a generator flip-flop 6 and an inverter 8. The generator flip-flop 6 receives a clock signal from a clock 7 that is configured to output a periodic clock pulse at a stable clock frequency. At each clock pulse, the generator flip-flop 6 outputs a signal, which is provided to the inverter 8 and to a circuit sub-portion 10. The output of the inverter 8 is provided to the input of the generator flip-flop 6, meaning that the logic value of the signal output by the generator flip-flop 6 is alternated with every clock cycle, and thus alternates at the stable clock frequency.

The circuit sub-portion 10 introduces a propagation delay to the alternating logic signal and thus may be represented as a delay chain. The delayed signal is output from the circuit sub-portion 10 and is provided to a "capture" stage of the offset detection circuit 2.

The capture stage comprises five capture flip-flops 12a, 12b, 12c, 12d, 12e, and four buffers 14a, 14b, 14c, 14d. The buffers 14a-d introduce an incremental propagation delay to the delayed alternating logic signal which is a sub-division of the alternating logic signal so that the offset can be more accurately determined.

The first capture flip-flip flop 12a receives the delayed logic signal output from the circuit sub-portion 10 directly (i.e. without the signal propagating through a buffer 14a, 14b, 14c, 14d). The second capture flip-flop 12b receives the delayed logic signal output from the circuit sub-portion 10 after the signal has propagated through the first buffer 14a. The third capture flip-flop 12c receives the delayed signal output from the circuit sub-portion 10 after the signal has propagated through the first buffer 14a and the second buffer 14b. The fourth capture flip-flop 12d receives the delayed signal output from the circuit sub-portion 10 after the signal has propagated through the first, second and third buffers 14a, 14b, 14c. The fifth capture flip-flop 12e receives the delayed signal output from the circuit sub-portion 10 after the signal has propagated through all four of the buffers 14a, 14b, 14c, 14d.

The capture flip-flops 12a-e receive respective clock signals from the clock 7. Therefore, at each clock pulse of the clock 7, the capture flip-flops 12a-e sample the value of the delayed logic signal at their respective D-input. In the case of capture flip-flops 12b-e, the logic signal will be cumulatively delayed by the delay introduced by the circuit sub-portion 10 and the propagation delay(s) introduced by the respective buffers 14a-d. Each value stored in a respective capture flip-flop 12a-e is output when the next clock pulse is received from the clock 7. The outputs of the capture flip-flops 12a-e in this example thus provide a five-bit capture signal, wherein the output of the first capture flip-flop 12a corresponds to the least significant bit (LSB) of the capture signal and the output of the fifth capture flip-flop 12e corresponds to the most significant bit (MSB) of the capture signal.

The circuit 2 further comprises a phase correction stage, which comprises five phase-correction XOR gates 16a-e, each of which is arranged to receive the output of a respective capture flip-flop 12a-e. Each of the phase-correction XOR gates 16a-e is also arranged to receive the output of the generator flip-flop 6 directly (i.e. bypassing the circuit sub-portion 10). Owing to the arrangement of the circuit 2, the capture flip-flops 12a-e are arranged to sample the propagation of a logic HIGH signal when the output of the generator flip-flop 6 becomes logic LOW, and to sample the propagation of a logic LOW signal when the generator flip-flop 6 becomes logic HIGH.

Each phase-correction XOR gate 16a-e outputs a respective bit of a binary "phase-corrected" signal that is independent of whether the (delayed) alternating logic signal has transitioned from a logic LOW signal to a logic HIGH signal or vice versa. It will be appreciated that it is merely the position of the logic transition along the capture flip-flops 12a-e (i.e. the timing of the logic transition with respect to the clock signal), rather than the particular change in logic value, that is important for determining the delay. By increasing the number of flip-flops in the capture stage, this timing can be determined with greater granularity.

The circuit 2 further comprises an edge travel stage, which is used to generate a six-bit edge travel signal comprising a single logic HIGH bit and five logic LOW bits. The location of the logic HIGH bit represents of the position of the logic transition along the capture flip-flops 12a-e, and thus of the delay introduced by the circuit sub-portion 10. The edge travel stage comprises six edge-travel XOR gates 18a-f. The first edge-travel XOR gate 18a, which corresponds to the LSB of the binary edge travel signal, receives a constant logic HIGH signal from a voltage source 20. The sixth edge-travel XOR gate receives a constant logic LOW signal from ground 22 at one of its inputs. It will be appreciated that the voltage source 20 and the ground terminal 22 in the example shown in FIG. 1 are primarily figurative, and may be replaced with logically equivalent circuitry as required, e.g. using tie-high/tie-low gates. This may help to avoid Design Rule Checking (DRC) violations.

The first edge-travel XOR gate 18a receives the output from the first phase-correction XOR gate 16a, as well as the logic HIGH signal from the voltage source 20. The second edge-travel XOR gate 18b compares the outputs of the first and second phase-correction XOR gates 16a, 16b. The third edge-travel XOR gate 18c compares the outputs of the second and third phase-correction XOR gates 16b, 16c. The fourth edge-travel XOR gate 18d compares the outputs of the third and fourth phase-correction XOR gates 16c, 16d. The fifth edge-travel XOR gate 18e compares the outputs of the fourth and fifth phase-correction XOR gates 16d, 16e. The sixth edge-travel XOR gate 18f receives the output from the fifth edge-correction XOR gate 16e, as well as the logic LOW signal from ground 22. The output of the edge travel stage is a six-bit signal (each bit being the output of a respective XOR gate 18a-f).

The circuit 2 further comprises a mask comparison stage, comprising a mask input 30, for receiving a six-bit mask signal, and six AND gates 24a-f. The first AND gate 24a receives the first bit (LSB) of the mask signal and the output of the first edge-travel XOR gate 18a. The second AND gate 24b receives the second bit of the mask signal and the output of the second edge-travel XOR gate 18b. The third AND gate 24c receives the third bit of the mask signal and the output of the third edge-travel XOR gate 18c. The fourth AND gate 24d receives the fourth bit of the mask signal and the output of the fourth edge-travel XOR gate 18d. The fifth AND gate 24e receives the fifth bit of the mask signal and the output of the fifth edge-travel XOR gate 18e. The sixth AND gate 24f receives the sixth bit (MSB) of the mask signal and the output of the sixth edge-travel XOR gate 18f.

The mask comparison stage further comprises five OR gates 26a-26e. The first OR gate 26a receives the respective outputs from the first AND gate 24a and the second AND gate 24b. The second OR gate 26b receives the respective outputs from the first OR gate 26a and the third AND gate 24c. The third OR gate 26c receives the respective outputs from the second OR gate 26b and the fourth AND gate 24d. The fourth OR gate 26d receives the respective outputs from the third OR gate 26c and the fifth AND gate 24e. The fifth OR gate 26e receives the respective outputs from the fourth OR gate 26d and the sixth AND gate 24f. The output of the fifth OR gate 26e is issued from the output 28 of the circuit 2.

Thus, in the mask comparison stage of the circuit 2, each bit of the edge-travel signal is compared with a corresponding bit of the configurable mask signal received at the mask input 30. The configurable mask signal defines an allowable range of times (indicated by logic HIGH values) within which it is desired or expected for the logic transition of the alternating logic signal to occur. When both of a pair of compared bits are logic HIGH, a logic HIGH value is output and is propagated through the array of OR gates 26a-e to the output 28. Thus, a logic HIGH signal is issued from the output 28 of the circuit 2 when the transition in the alternating logic signal occurs at the same time (or within the same range of times) as indicated by the mask signal.

The operation of the circuit 2 of FIG. 1 will now be described with reference to FIGS. 2-5, which show logic tables for each stage of the circuit 2 under different operating conditions when a mask signal of 000110 is provided at the mask input 30.

Figure 2:
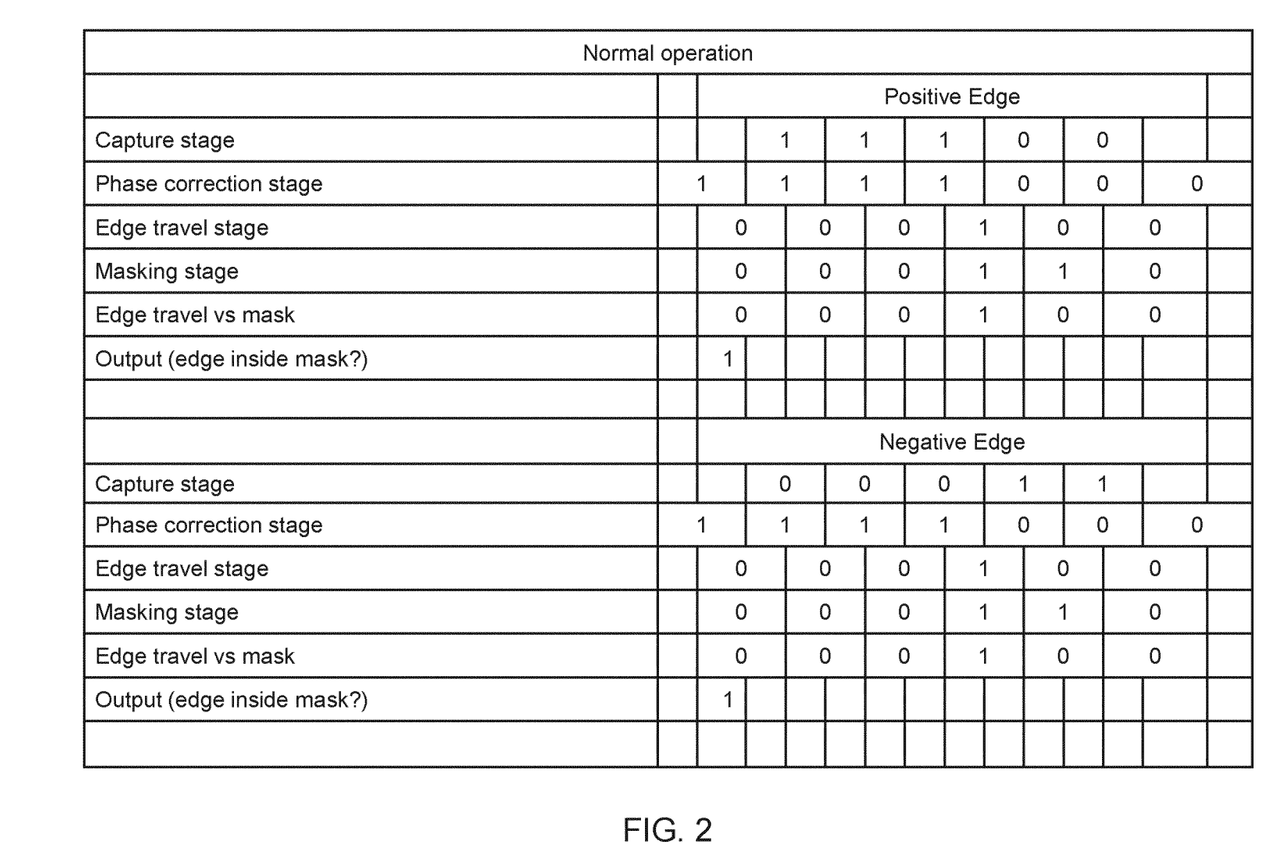
FIG. 2 shows a logic table containing the outputs of each stage of the circuit of FIG. 1 when the delay is within an allowable threshold as set by the mask signal.

FIG. 2 shows a logic table containing the outputs of each stage of the circuit 2 when the delay introduced by the circuit sub-portion 10 is within the configurable allowable threshold, as set by the mask signal 000110. As can be seen, the circuit 2 is configured to detect the location of both "Positive Edge" transitions (i.e. to determine the propagation of a logic HIGH signal) and "Negative Edge" transitions (i.e. to determine the propagation of a logic LOW signal).

The delayed logic signal propagates through the capture stage by an amount that depends on the length of the delay introduced by the circuit sub-portion 10. In the scenario shown in FIG. 2, the delay introduced by the circuit sub-portion 10 is such that the logic transition in the alternating logic signal occurs between the third flip-flop 12c and the fourth flip-flop 12d of the capture stage. Hence, the binary values stored by the flip-flops 12a-e are 11100 (i.e. with capture flip-flops 12a-c storing a logic HIGH signal and capture flip-flops 12d, 12e storing a logic LOW signal) when a Positive Edge transition is detected, and 00011, when a Negative Edge transition is detected.

As described above, the phase correction stage outputs a binary "phase-corrected" signal that is independent of whether the delayed alternating logic signal has transitioned from a logic LOW signal to a logic HIGH signal or vice versa. Thus, for both the Positive Edge and Negative Edge transitions, the phase correction stage outputs the binary signal 1111000. This binary signal includes the LSB and MSB bit values respectively provided by the voltage source 20 and the ground 22.

As can be seen in the six-bit edge travel signal output from the edge travel stage, the location of the logic transition along the capture flip-flops 12a-e is represented by a logic HIGH (1) value. The edge travel signal 000100 is compared with the mask signal 000110 in the "Edge travel vs mask" stage. In this case, the respective values of the fourth bit of the mask signal and the edge travel signal are both logic HIGH. As a result, a logic HIGH value is propagated through the array of OR gates 26a-e to the output 28.

The logic HIGH output (in the "Output" rows of the table of FIG. 2) indicates that the delay introduced by the circuit sub-portion 10 is within the configurable allowable range indicated by the mask signal. The delayed alternating logic signal is sampled at every clock cycle of the clock 7, meaning that changes in the delay can be continuously monitored.

Figure 3:
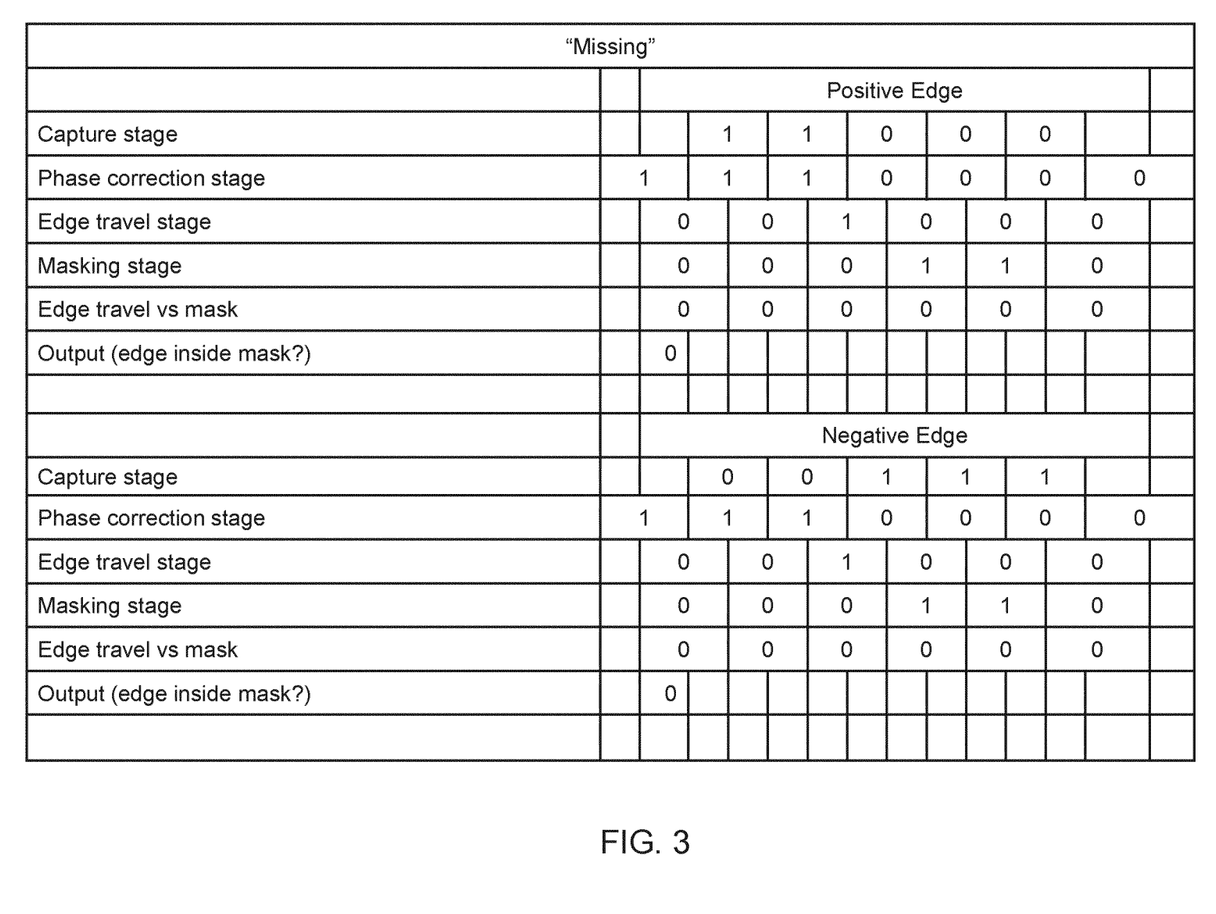
FIG. 3 shows a logic table containing the outputs of each stage of the circuit of FIG. 1 when the delay is shorter than that represented by the mask signal.

FIG. 3 shows a logic table containing the outputs of each stage of the circuit 2 when the delay introduced by the circuit sub-portion 10 is of such a length that the logic transition in the alternating logic signal occurs earlier than anticipated. This can be seen by comparing the edge travel signal 001000 and the masking signal 000110, as the logic HIGH value in the edge travel signal occurs at a lower bit position than the logic HIGH values in the masking signal. This demonstrates that the logic transition in the alternating logic signal has had relatively less time to propagate through the capture-stage flip-flops 12a-e, owing to the delay introduced by the circuit sub-portion 10.

Thus, in this case, the circuit 2 outputs a logic LOW signal from the output 28. In response to such a logic LOW output signal, an alert may be triggered to inform a user of a clock glitch or of a voltage tampering event, for example.

Figure 4:
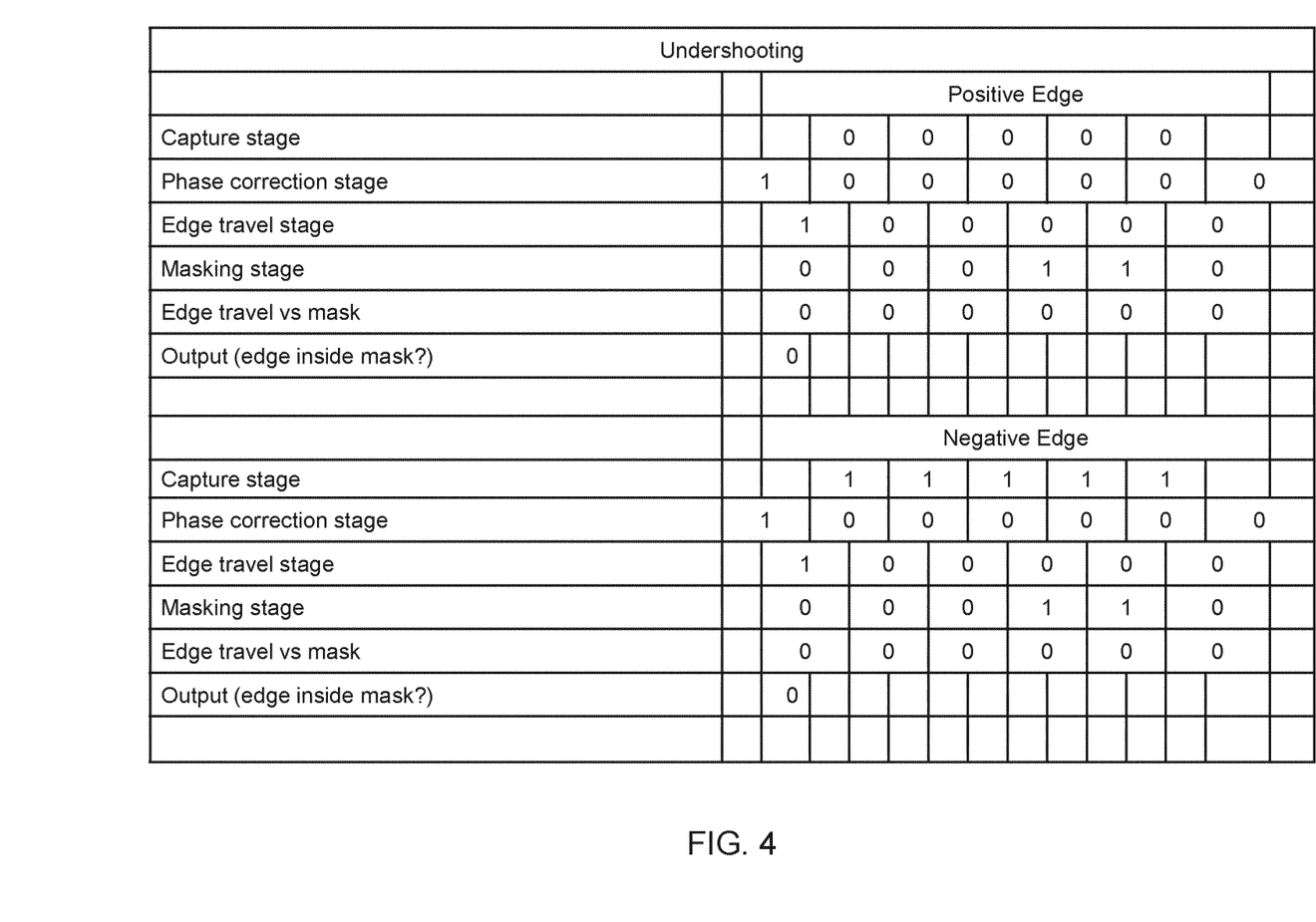
FIG. 4 shows a logic table containing the outputs of each stage of the circuit of FIG. 1 when the logic transition occurs too early for it to be captured by the capture stage.

FIG. 4 shows a logic table containing the outputs of each stage of the circuit 2 when the delay introduced by the circuit sub-portion 10 is of such a length that the logic transition in the alternating logic signal occurs too early for its location to be captured by the capture stage. This may occur when the delay introduced by the circuit sub-portion is reduced significantly compared to usual by unusual circumstances.

Figure 5:
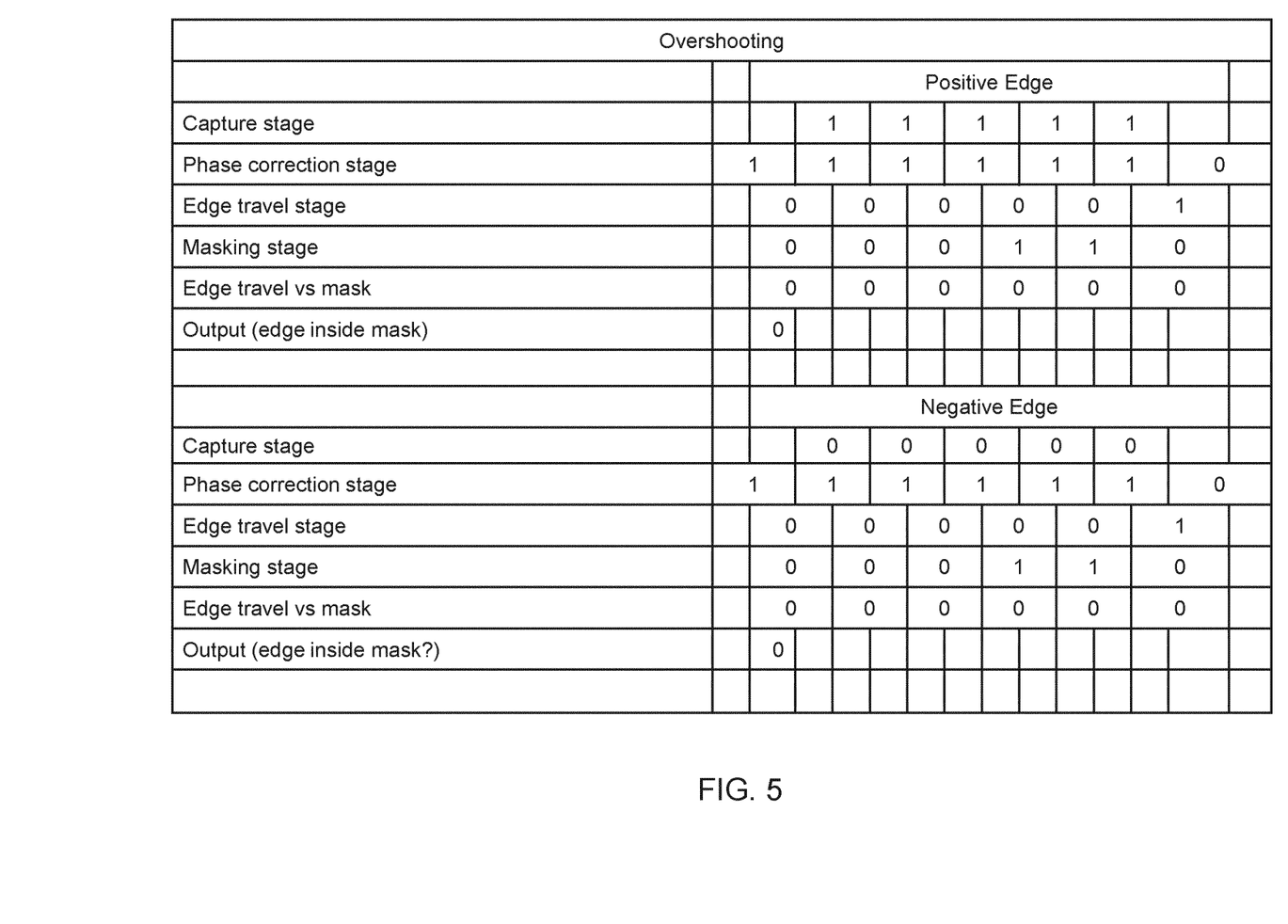
FIG. 5 shows a logic table containing the outputs of each stage of the circuit of FIG. 1 when the logic transition occurs too late for it to be captured by the capture stage.

FIG. 5 shows a logic table containing the outputs of each stage of the circuit 2 when the delay introduced by the circuit sub-portion 10 is of such a length that the logic transition in the alternating logic signal occurs too late for its location to be captured by the capture stage. This may occur when the delay introduced by the circuit sub-portion delays the logic transition significantly.

It can be seen that, in the scenarios represented by the logic tables of FIGS. 4 and 5 respectively, the circuit 2 is able to detect abnormal operation and consequently to output a logic LOW signal from the output 28, even though the location of the logic transition is not captured by the capture stage. The circuit 2 may be configured to generate an alert in response.

The invention claimed is:

1. A circuit portion comprising:
a signal generator, clocked by a clock signal, for generating an alternating logic signal comprising a repeated sequence of alternating logic transitions;
a circuit sub-portion which introduces a delay to the alternating logic signal;
an edge-travel detector, configured to sample the delayed alternating logic signal and to output an edge-travel signal representative of a timing of a logic transition in the alternating logic signal with respect to the clock signal; and
a mask block, configured to:
receive a mask signal representative of a candidate timing or a plurality of candidate timings of the logic transition with respect to the clock signal, wherein the mask signal comprises a plurality of bit positions, each bit position corresponding to a portion of the period of the clock signal;
compare the mask signal with the edge-travel signal to determine whether the timing of the logic transition matches the candidate timing or one of the plurality of candidate timings; and
output a comparison signal that is dependent on whether the timing of the logic transition matches the candidate timing or one of the plurality of candidate timings.

2. The circuit portion of claim 1, wherein the mask signal is configurable.

3. The circuit portion of claim 1, wherein the edge-travel detector comprises a capture stage configured to sample the delayed alternating logic signal and to generate a first intermediate signal representative of the timing of the logic transition with respect to the logic clock signal.

4. The circuit portion of claim 3, wherein the capture stage comprises a plurality of capture-stage flip-flops configured to sample the delayed alternating logic signal such that the timing of the logic transition in the alternating logic signal, with respect to the clock signal, is indicated by digital values stored in the plurality of capture-stage flip-flops.

5. The circuit portion of claim 3, wherein the capture stage further comprises one or more delay elements, each configured to introduce a respective further delay to the delayed alternating logic signal.

6. The circuit portion of claim 3, wherein the edge-travel detector comprises a phase-correction stage configured to modify the first intermediate signal to generate a second intermediate signal representative of the timing of the logic transition with respect to the clock signal, wherein the value of the second intermediate signal is independent of a direction of the logic transition.

7. The circuit portion of claim 3, wherein the edge-travel detector further comprises an edge-travel stage configured to modify the first intermediate signal or a second intermediate signal to generate the edge-travel signal.

8. The circuit portion of claim 1, wherein the edge-travel signal comprises a plurality of bit positions, each bit position corresponding to a portion of the period of the clock signal, and wherein the timing of the logic transition is represented by the value of the edge-travel signal at each bit position.

9. The circuit portion of claim 1, wherein the edge-travel signal comprises one unique bit and one or more opposite bits, the bit position of the unique bit being indicative of the timing of the logic transition with respect to the clock signal.

10. The circuit portion of claim 1, wherein the candidate timing or the plurality of candidate timings are indicated depending on the value of the mask signal at each bit position.

11. The circuit portion of any preceding claim 1, wherein the circuit portion is configured to be calibrated by generating an edge-travel signal and using said signal as an initial mask signal.

12. The circuit portion of claim 1, wherein the comparison signal is a single-bit signal.

13. The circuit portion of claim 1, wherein the circuit portion is configured to generate an alert when the value of the comparison signal indicates that the timing of the logic transition is not the same as the candidate timing or one of the plurality of candidate timings.

14. The circuit portion of claim 1, wherein the signal generator comprises a toggle flip-flop.

15. The circuit portion of claim 1, wherein the alternating logic signal alternates at the frequency of the clock signal.

16. The circuit portion of claim 1, wherein the circuit sub-portion is a dedicated delay portion comprising a delay chain.

* * * * *